United States Patent
Shoup et al.

(10) Patent No.: US 7,717,189 B2
(45) Date of Patent: May 18, 2010

(54) PLANTER WITH REMOTE HYDRAULIC FEED

(75) Inventors: Kenneth E. Shoup, Bonfield, IL (US); Alan F. Barry, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 143 days.

(21) Appl. No.: 12/103,014

(22) Filed: Apr. 15, 2008

(65) Prior Publication Data

US 2008/0257573 A1    Oct. 23, 2008

Related U.S. Application Data

(60) Provisional application No. 60/912,559, filed on Apr. 18, 2007.

(51) Int. Cl.
*A01B 63/00* (2006.01)
(52) U.S. Cl. ........................ 172/456; 172/311
(58) Field of Classification Search ............... 37/234, 37/468; 56/14.9, 15.6, 15.9; 172/311, 448, 172/456, 624.5, 626, 679, 677, 680, 683, 172/773, 776; 280/479.5, 412, 491.4, 420, 280/421, 491.2, 491.3
See application file for complete search history.

(56) References Cited

U.S. PATENT DOCUMENTS

| | | |
|---|---|---|
| 4,364,581 A | 12/1982 | Shoup |
| 4,506,904 A | 3/1985 | Kinzenbaw |
| 4,552,375 A | 11/1985 | Kinzenbaw |
| 4,648,334 A | 3/1987 | Kinzenbaw |
| 4,721,168 A * | 1/1988 | Kinzenbaw .................. 172/311 |
| 5,346,019 A | 9/1994 | Kinzenbaw |
| 5,488,996 A | 2/1996 | Barry |
| 5,647,440 A | 7/1997 | Barry |
| 5,740,870 A | 4/1998 | Rodgers |
| 6,205,937 B1 | 3/2001 | Shoup |
| 6,408,950 B1 | 6/2002 | Shoup |
| 6,494,154 B2 | 12/2002 | Kinzenbaw |
| 6,691,794 B2 * | 2/2004 | Paluch et al. ................. 172/679 |
| 7,182,146 B2 * | 2/2007 | Erickson et al. ............. 172/776 |
| 7,562,719 B1 * | 7/2009 | Misenhelder et al. ........ 172/456 |

\* cited by examiner

*Primary Examiner*—Robert E Pezzuto
(74) *Attorney, Agent, or Firm*—Wildman, Harrold, Allen & Dixon LLP

(57) ABSTRACT

An agricultural implement, such as a planter, having a telescoping tongue for placing the implement in either a transport or field use configuration, includes an hydraulic pump located on the planter frame, preferably toward the rear, for powering the planting functions. A mechanical drive line from the PTO of the tractor to the remote hydraulic pump is disengaged as the planter frame begins to move from the planting position. The drive line permits the tractor to make full 90° turns in the field.

12 Claims, 17 Drawing Sheets

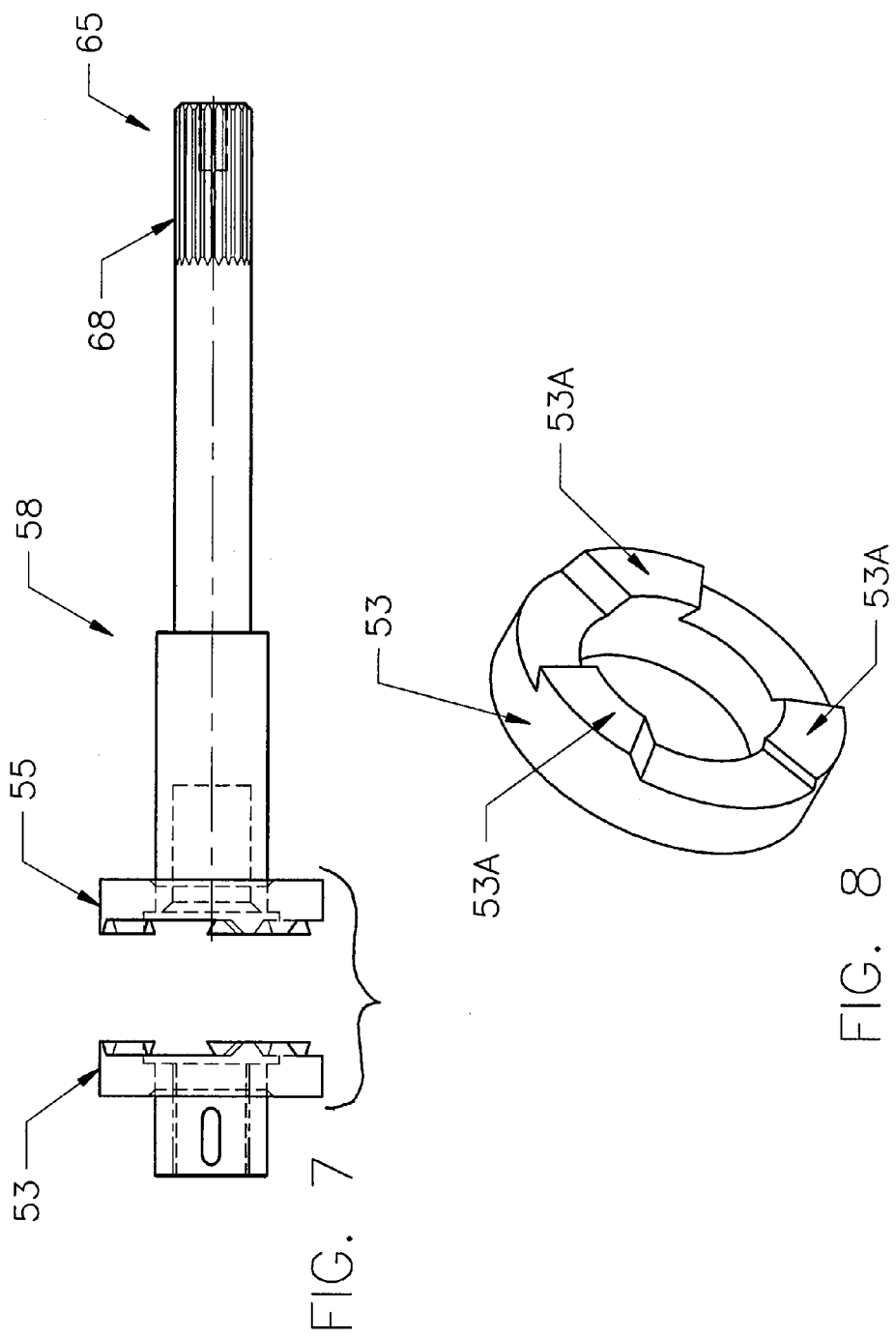

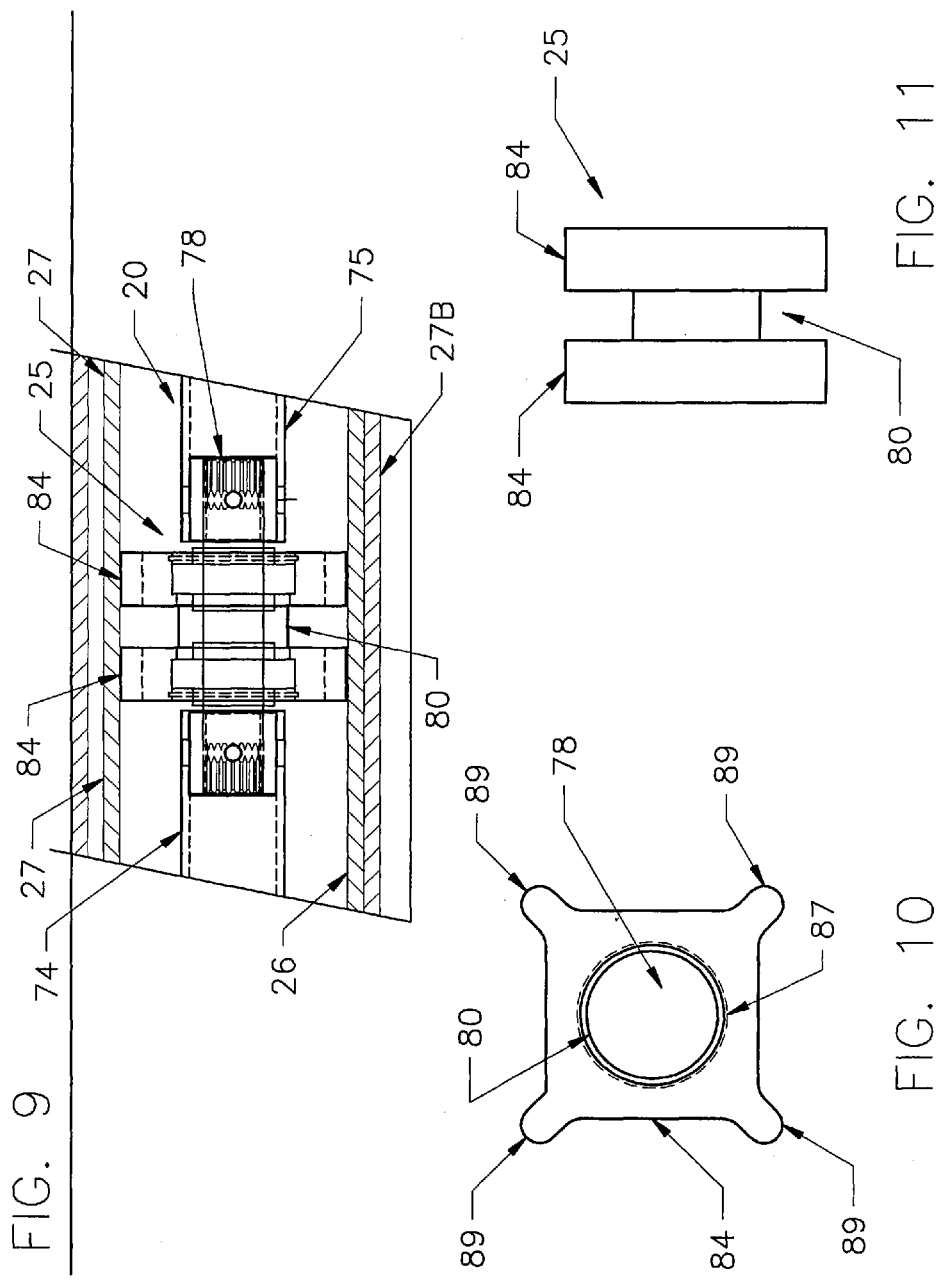

PLANTER WITH REMOTE HYDRAULIC FEED

RELATED APPLICATION

This application claims priority from U.S. Provisional Application No. 60/912,559 entitled "PLANTER WITH REMOTE HYDRAULIC FEED" filed Apr. 18, 2007.

FIELD OF THE INVENTION

The present invention relates to agricultural implements, particularly those having telescoping tongues particularly those which convert between a transport configuration and a field use position, for example as with planters.

BACKGROUND OF THE INVENTION

An agricultural implement, such as a planter, may have a telescoping tongue connected to a tractor hitch and including at least first and second elongated tubular members arranged in telescoping relation and moveable under hydraulic power (i.e., a hydraulic cylinder) between an extended and a retracted position. In the illustrated embodiment, the retracted position of the telescoping tongue is the field position of the implement—that is, the wings are extended to the side for planting; and with the tongue in the elongated position, the implement is configured for road travel or storage.

In the extend position of the tongue, the wings are folded to extend in the direction of travel. The front of the inner telescoping member is mounted to the tractor hitch; and the outer telescoping member is moved by a hydraulic cylinder between the field and transport positions, as in U.S. Pat. Nos. 6,205,937 and 6,408,950.

Over the years, planters have become larger (i.e. they have a wider planting swath), and many additional operational features have been added to the conventional ones, such as row markers, and the like. Many of the added accessories or functions require hydraulic motors or hydraulic cylinders to operate, such as air fans for seed delivery, conveyors for central seed distribution, storage hopper augers, lift cylinders, etc.

To accommodate these needs, some farmers have had larger hydraulic pumps installed in the tractors, but as features have continued to be added to the planter frame, the number and size of hydraulic feed hoses have increased as well. It will be realized that the hydraulic hoses must be routed along the wing braces or tongue of the planter (usually with special retainers), and this has created a problem with the mounting and routing of the hydraulic feed lines along the wing braces or telescoping tongue to the tool bar where the planter row units and accessories are mounted. These hose routing inconveniences are exacerbated when it is considered that they run through the wing braces and thence back to the center of the planter frame.

SUMMARY OF THE INVENTION

Briefly, the present invention provides a system for mounting a hydraulic pump for powering the accessories or planting function drives of the planter on the planter frame, preferably to the rear of the telescoping tongue. Mounting the hydraulic pump at the rear end of the telescoping tongue eliminates most of the multiple hydraulic lines previously needed to feed the accessories extended along the wing braces or the telescoping tongue. Exceptions include planter folding and transport/lift functions.

The hydraulic pump mounted to the rear of the moveable (or sliding) member of the telescoping tongue is mechanically connected directly to the tractor power takeoff (PTO) when the planter is configured in the field position, and the hydraulic pump is disconnected from the tractor PTO in the transport position because the drive line (which may be located inside or outside the tubular telescoping members of the planter tongue) includes a spring-actuated disengageable coupling which becomes disengaged as the tongue (in the illustrated embodiment) is configured to the transport position. This structure is referred to as a disengageable drive line because it is engaged (and thus drives the hydraulic pump) only in the field use (or simply "field") position.

One advantage of the present invention is that the accessory/planting hydraulic circuit which includes the hydraulic pump mounted on the implement (as opposed to on the tractor) is that the remote hydraulic circuit is separate from the hydraulic circuit which performs the planter transport/lift functions, which may include: folding and unfolding the planter; sliding the transport axle to the transport position; raising and lowering the planter for transport or use; and redundant operation of the field wheels during folding or unfolding operations.

A hitch for mounting the front of the planter to the three-point hitch of the tractor includes a pair of right-angle gearboxes (or simply "gears") mounted in vertical drive alignment on the turn axis of the hitch. This provides a direct mechanical drive from the tractor PTO to a main disengageable drive shaft mounted on or within the telescoping tongue, while permitting the tractor to make full 90° right or left turns.

Other features and advantages of the present invention will be apparent to persons skilled in the art from the following description of the invention accompanied by the drawing.

BRIEF DESCRIPTION OF THE DRAWING

FIG. 7 is a side view of the components of the disengageable drive coupler with the two coupler parts disengaged;

FIG. 8 is a perspective view of the engaging face of the drive coupler;

FIG. 9 is a side cutaway view of the upper portion telescoping tubes of the planter tongue showing the bearing connections and supports for adjacent sections of the main drive shaft extending within the telescoping tongue;

FIG. 10 is an end view of a mount for the shaft bearing support of FIG. 9;

FIG. 11 is a side view of the bearing support shown in FIG. 9;

DETAILED DESCRIPTION OF THE ILLUSTRATED EMBODIMENT

Figure 1:
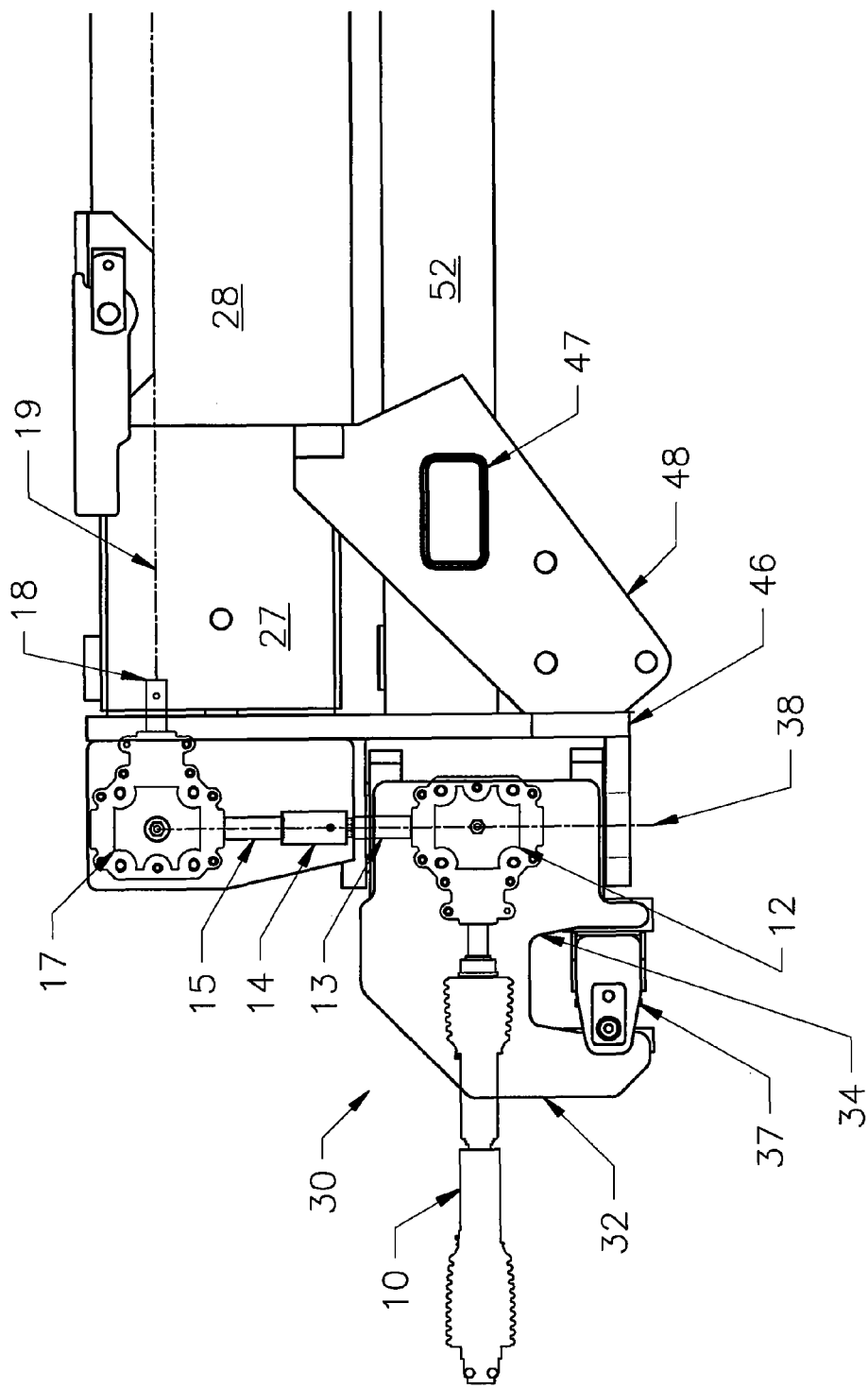
FIG. 1 is a fragmentary left side view of the forward portion of a first embodiment of the planter hitch, disengageable drive line and telescoping tongue in the field use position.

Referring first to FIG. 1, reference numeral 10 generally designates a conventional power takeoff (PTO) of an agricultural tractor. PTOs are typically used to transmit power mechanically from the engine of the tractor to many types of auxiliary devices, including directly driven implements, as well as hydraulic pumps which are, in turn, used to power hydraulic motors for various planter functions.

The power takeoff 10 is directly coupled to the input of a first right-angle gearbox (or "gear") 12, having an output shaft 13 connected by means of a coupler 14 to a drive shaft 15 of a second right-angle gear 17. The output shaft of the second right-angle gear is designated 18, and its axis is horizontal. The gear shaft 18 is directly mechanically connected to a forward segment of a drive shaft 20 (see FIGS. 2 and 13), having an axis extending along the horizontal chain line 19 (FIG. 1). The drive shaft 20 (FIGS. 2, 4 and 9) is part of the drive chain for the hydraulic pump and is divided into similar segments or sections 21, 21A connected end-to-end, as will be described. Adjacent ends of the drive shaft segments are connected, and they are aligned and supported by bearing/connectors to be described further in connection with FIGS. 9-11.

Figure 2:
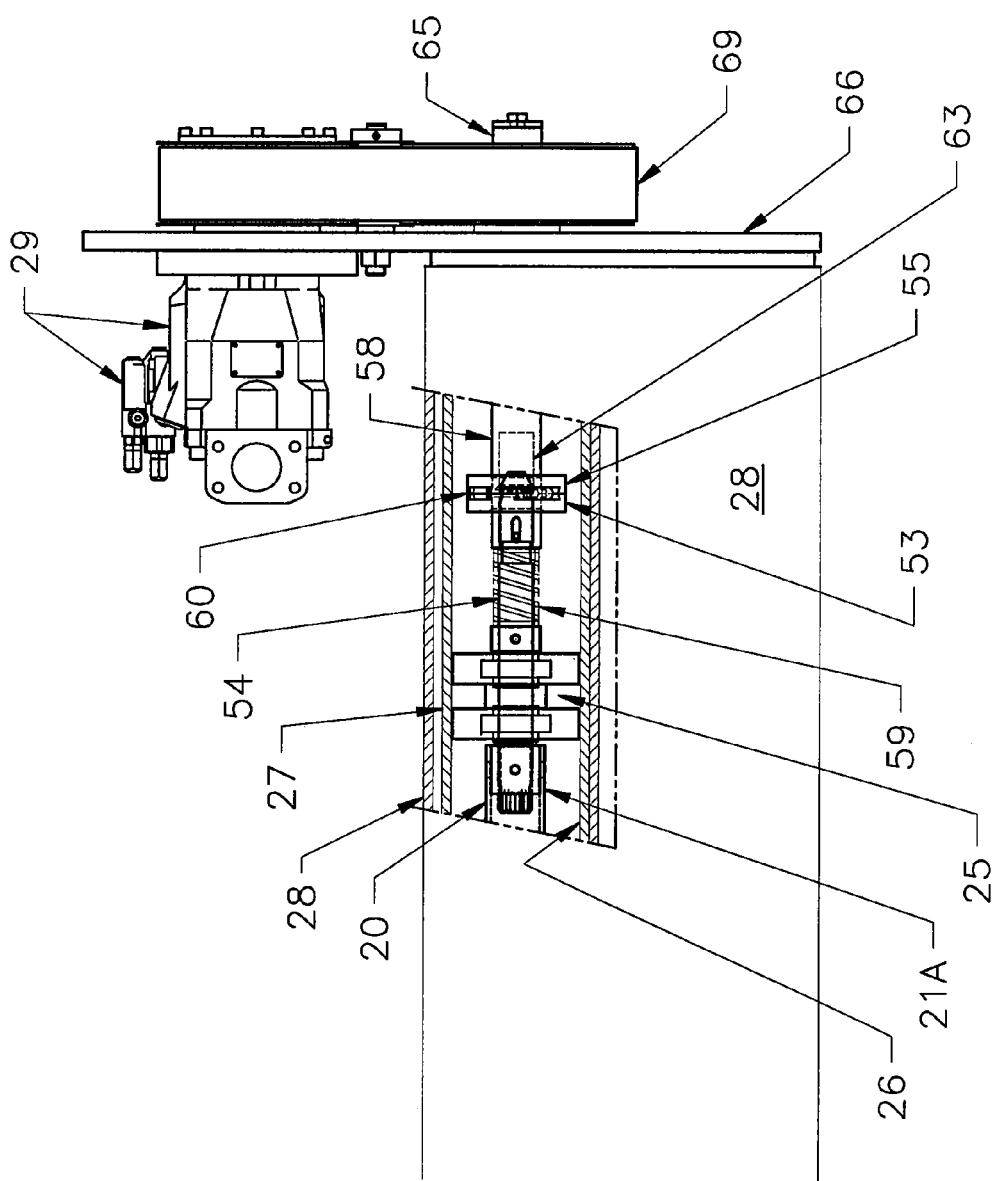
FIG. 2 is a fragmentary left side view of the rear of the telescoping tongue in the field use position, with a portion cut away to see the drive line in the engaged position.
Figure 4:
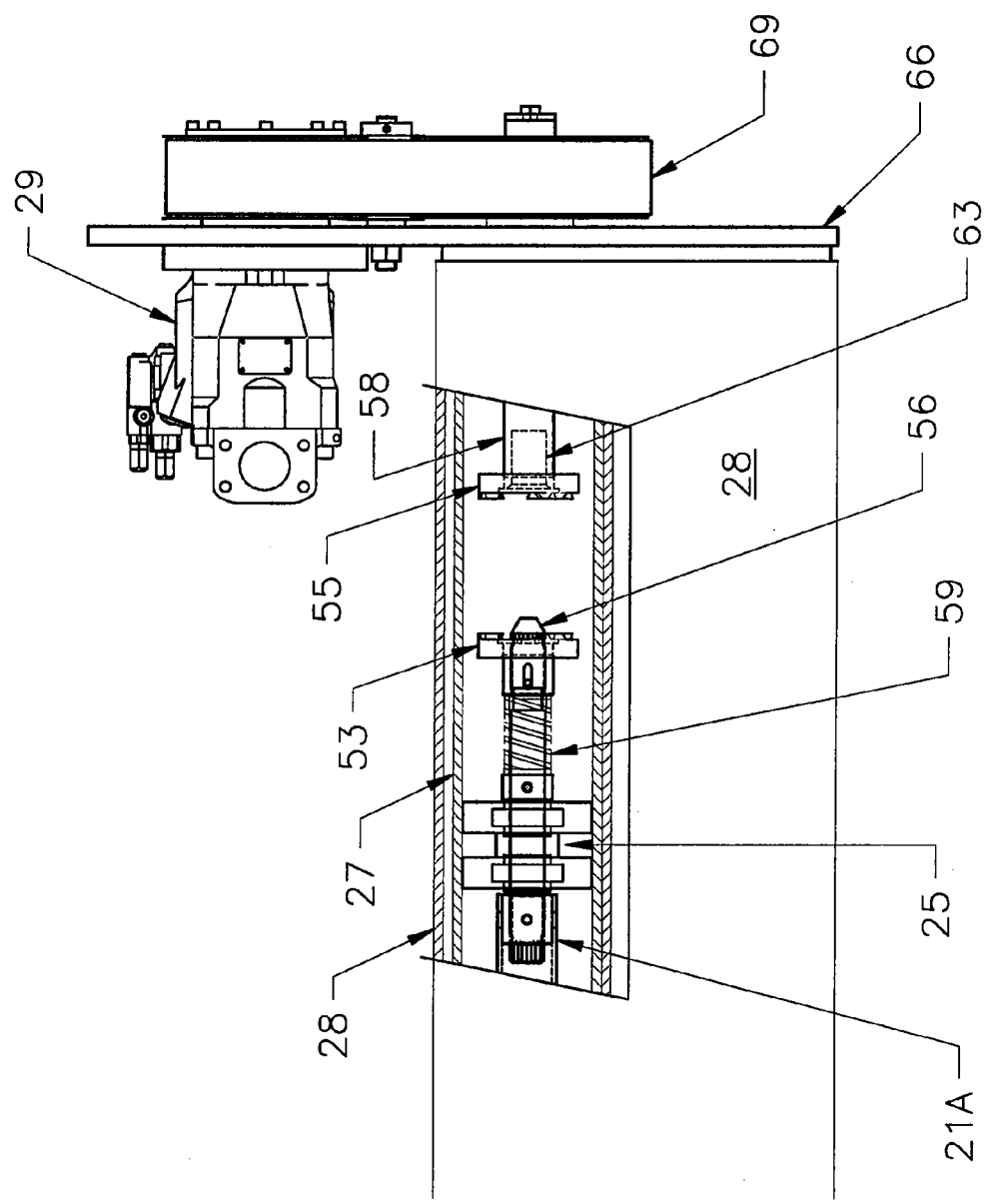
FIG. 4 is a view similar to FIG. 2 as the telescoping tongue extends toward the transport position with the drive line disengaged and a portion of the two telescoping members of the tongue cut away to show the drive coupling disengaged.

The planter has a telescoping tongue, including first and second tubular telescoping members designated 27 and 28 in FIG. 1. In the illustrated embodiment, the tubular telescoping member 27 is an inner member, and the outer member 28 receives the inner member 27 in telescoping relation. Further, in the illustrated embodiment, it is the outer telescoping member 28 which moves longitudinally relative to the planter hitch. The front end of the inner telescoping member 27 is mounted to the planter hitch which is generally designated 30 and will be described presently. Inner tubular member 27 may be formed by joining an upper tube 27A and a lower tube, the upper wall of which is designated 27B in FIG. 9. As seen in FIGS. 2 and 4, an hydraulic pump (designated 29 in FIGS. 2 and 4) is mounted to a plate 66 at the rear of the moveable telescoping member 28, the purpose of which will be described in more detail within.

Although in the illustrated embodiments, the smaller (i.e., in cross section) telescoping member is mounted to the planter hitch, planters are known in which the larger (i.e. in cross section) of the two telescoping members is mounted to the planter hitch, and the smaller telescoping member moves within the outer telescoping member to configure the planter in the transport position or for field use.

Turning now to the planter hitch 30, it is mounted to the front of the telescoping tongue for rotation about vertical axis 38 (the hitch axis).

Figure 5:
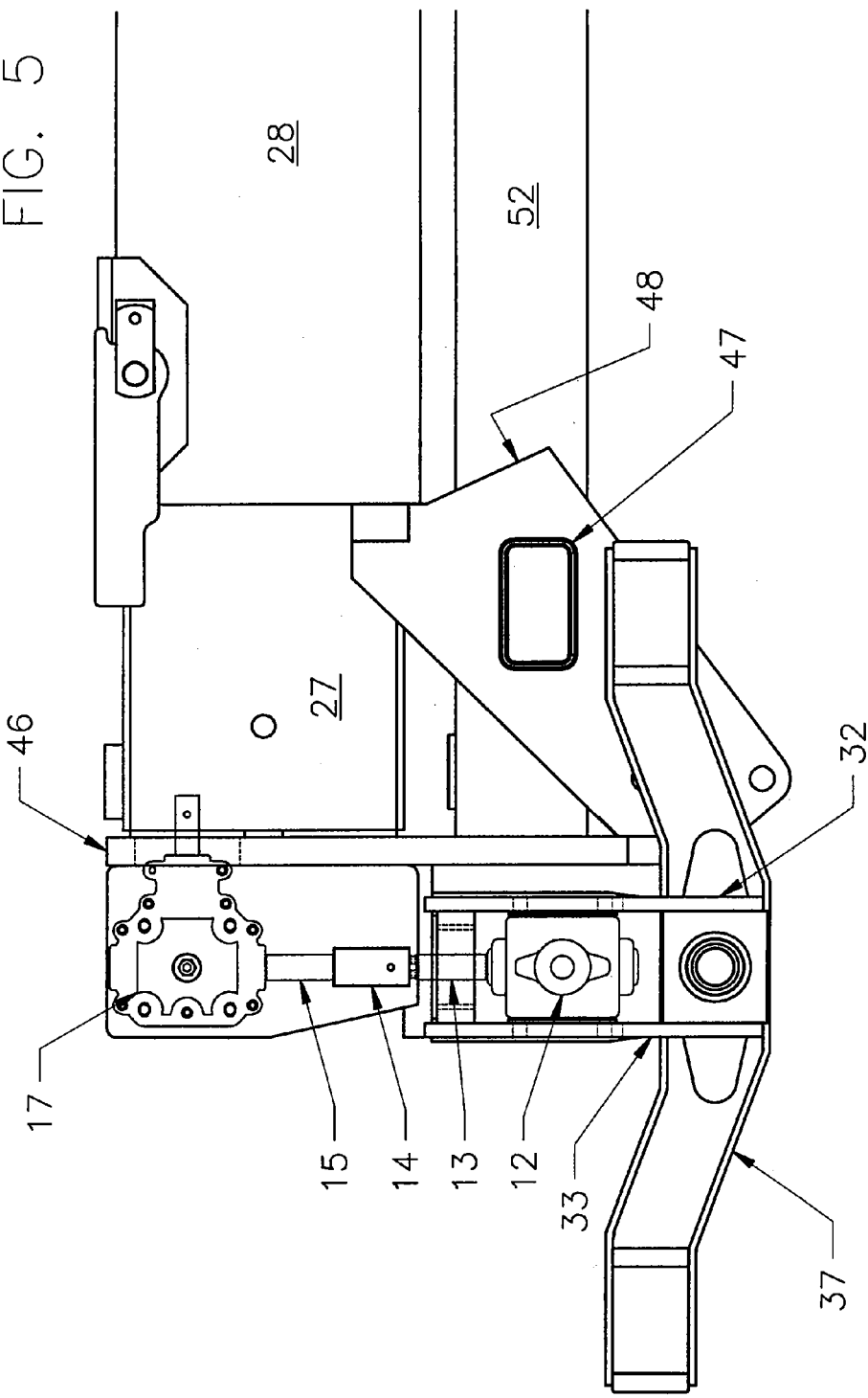
FIG. 5 is a left side fragmentary view of the planter hitch and front right-angle gear boxes, with the hitch executing a left turn.

The planter hitch 30 includes a pair of vertical, parallel side plates 32, 33, see FIG. 5 (the right plate 32 being shown in FIG. 1), which are notched (as seen at 34 for plate 32 in FIG. 1) to fit over the transverse draw bar 37 of the tractor three-point hitch (the remainder of the tractor hitch is conventional and is not necessary for an understanding of the present invention).

The side plates 32, 33 of the planter hitch are mounted together to form a rigid housing which receives and to which the power takeoff 10 of the tractor is mounted. Power takeoff 12 drives the horizontal input shaft of lower right angle gear 12. The planter hitch 30 is mounted so that the tractor and planter may rotate relative to each other about vertical hitch axis 38. The planter hitch 30 is thus a swivel hitch, capable of pivoting about the vertical axis 38 relative to the planter. Axis 38 is collinear with the axes of the output shaft 13 of the lower right-angle gear 12 and the input shaft 15 of the upper right-angle gear 17. By having the planter hitch 32 pivotable about the axis of shafts 13, 15, the tractor may turn left or right relative to the planter. FIG. 5 shows a full 90° left turn for the tractor, with the right-angle gears 12, 17 accommodating such turns.

As illustrated in FIG. 5, in which the tractor is turning left at 90°, this feature of the lower gear being mounted to the tractor via a swivel mount and the upper gear mounted to the planter frame with the gears aligned on the pivot axis enables the planter to pivot greater than 90° relative to the center line of the tractor (i.e., the direction of travel of the tractor), while continuing the direct mechanical drive line in all angles of inclination through the upper right-angle gear 17 (which is rigidly mounted to the vertical front plate 46 of the planter tongue) and feeds power along the main segmented drive shaft 20 (FIG. 2) to the hydraulic pump. The drive shaft 20, due to its length, may be formed of a plurality of sections connected end-to-end. Referring to FIGS. 2 and 9, an elongated closed upper tube 27A is part of the inner telescoping member 27 which houses the drive line from the upper right-angle gear 17 to the rear end of the inner telescoping member 27. Each pair of adjacent drive segments is supported by a support bearing/connector shown in FIGS. 9-11 and described further within, for whatever length is required, that length being determined by the axial length of the telescoping tongue in the transport or telescoped position (for the illustrated embodiment, the telescoped position is the field use position).

Figure 3:
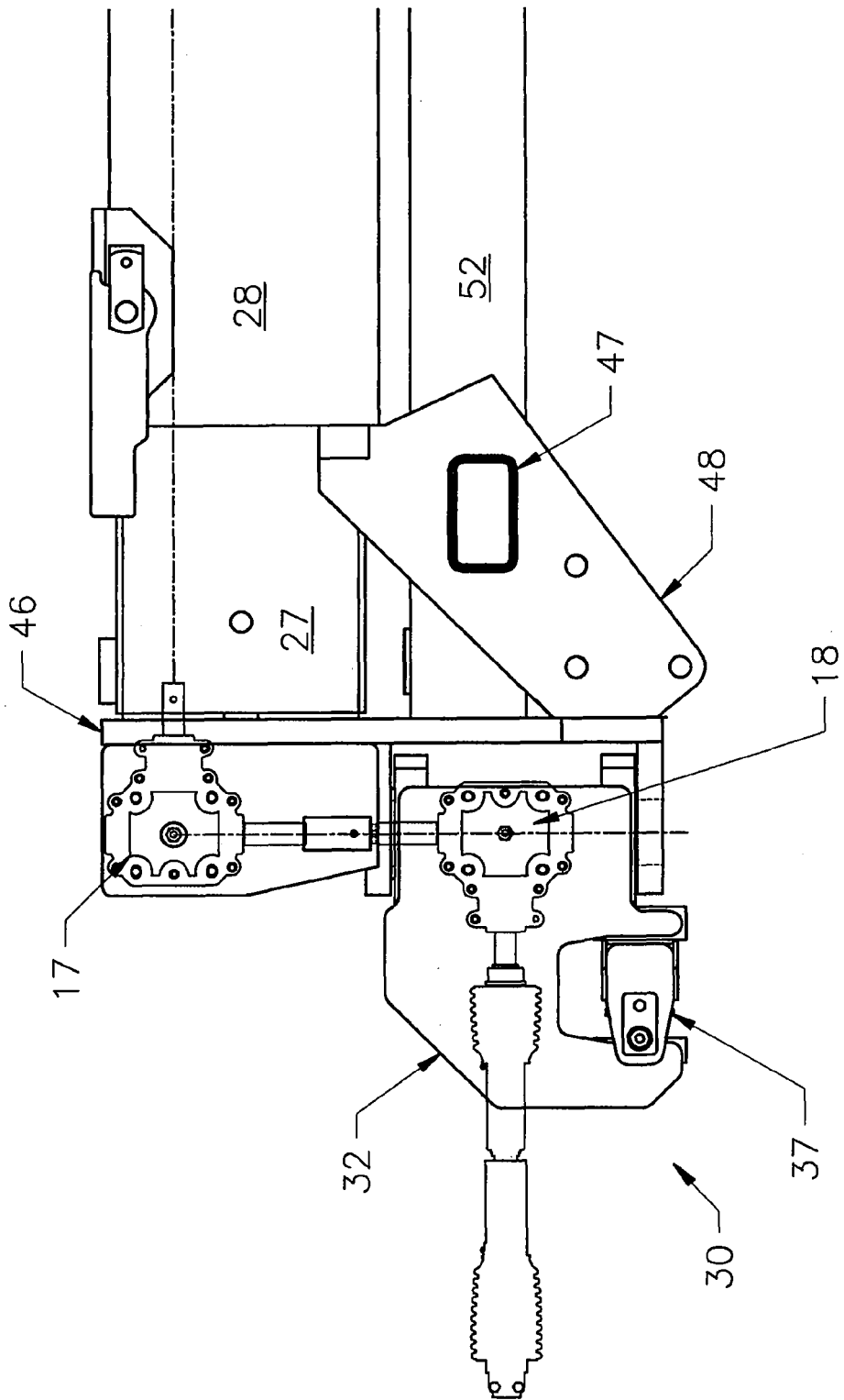
FIG. 3 is a fragmentary side view similar to FIG. 1, with the outer telescoping member as it begins moving rearward toward the transport position.

Turning now to FIGS. 1 and 3, a pair of laterally spaced support braces, one of which is seen in FIGS. 1 and 3 and designated 48, is welded to the rear of the vertical front plate 46 of the planter tongue and provided with a cross tube 47 which extends laterally through a rearwardly extending docking beam 52, for strengthening the docking beam 52 and limiting forward motion of the outer telescoping member 28 (seen in FIG. 1 in the forward limit position). The forward end of the inner telescoping member 27 is mounted to and supported by the vertical front plate 46 of the planter hitch, and the rear end of the outer telescoping member 28 is pivotally mounted to the inner ends of the pivoting wings of the planter to which the row units are mounted, in a manner known in the art and disclosed in the above-identified referenced patents.

Turning now to FIGS. 2 and 4, a portion of the outer telescoping member 28 and the inner telescoping member 27 is cut away to show the rearmost end of the rear segment 21A of the main driveshaft 20, which is provided with a support bearing/connector generally designated 25, the rear portion of which is provided with a tubular output shaft 54 (FIG. 2) about which is placed a spring 59. The rear end of the shaft 54 telescopically receives a shank to which a forward drive coupling member 53 is mounted. Thus, the drive coupling member 53 is spring-biased into driving engagement with a rear drive coupling member 55. Coupling member 53 includes a guide rod having tapered or fusto-conical guide surface 56 (FIG. 4). A mating female coupler member 55 (see also FIG. 7) is mounted by means of a stub-shaft 58 to the rear end of the outer telescoping member 28. Thus, as the telescoping tongue extends, the outer telescoping member 28 moves rearwardly (to the right in FIGS. 2 and 4), and the drive coupler, generally designated 60 is disengaged as the coupling elements 53, 55 separate. This occurs when the planter begins to move to the transport position, and it will be observed, therefore, that all accessory drive motors on the planter toolbar or planter frame are disconnected from power immediately upon initiation of the transport mode.

When the telescoping tongue members are moved to the retracted or field use position, the drive coupler 60 engages (advantageously at the end of the retraction), as seen in FIG. 2, with the spring 59 urging guide pin 50 to extend into a receptacle 63 in the second coupler 55. The driving position of the coupler 60 is seen in FIG. 2, as mentioned.

The forward (fixed) coupler element 53 is limited in its rearward motion and spring 59 biases it toward the rear (engaged) position shown in FIG. 2, but it is capable of moving forward for a short distance against the force of the spring 59 when the tongue is in the retracted position.

Figure 6:
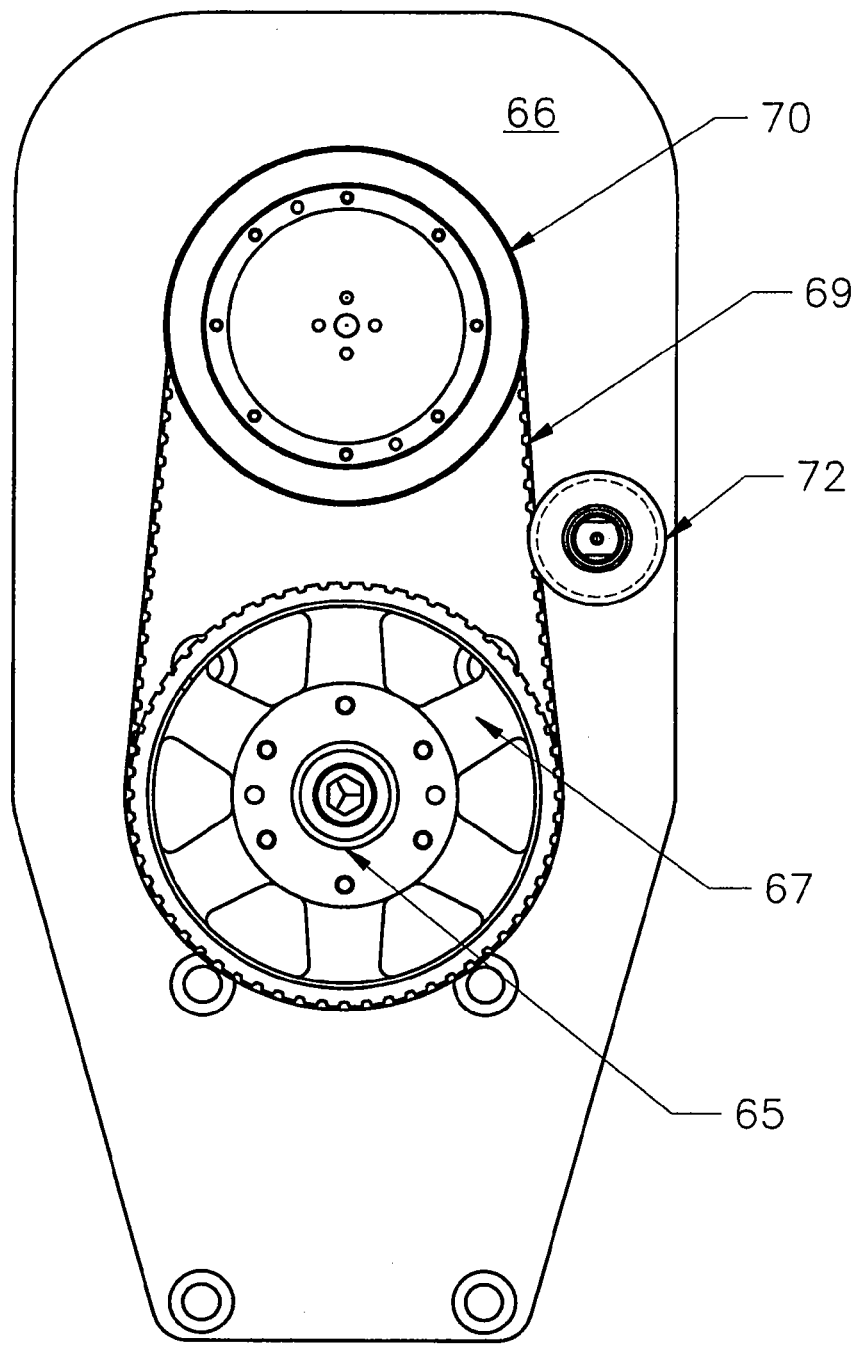
FIG. 6 is a rear elevational view of the pulley drive completing the direct mechanical drive to the input shaft of the rear-mounted hydraulic pump which powers planter accessories.

The stub-shaft 58 extends through, and is journalled in a rear mounting plate 66 which is secured to the rear end of the outer telescoping member 28, and extends above the outer tubular member 28 on which the hydraulic pump 29 is mounted (i.e. carried by the rear plate 66, as seen in FIG. 4. The stub-shaft 58 extends rearwardly to a portion designated 65 which, as seen in FIG. 6 drives a first pulley 67. The rear portion of the shaft 65, as seen in FIG. 7, is formed with splines 68 for driving engagement with the pulley 67. A drive belt 69 is entrained about the pulley 67 and drives an upper pulley 70 which is also rotatably mounted to the mounting plate 66. The pulley 70 includes a shaft which extends forwardly through the plate 66 and drives the hydraulic pump 29 (FIGS. 2 and 4). An idler pulley 72 (FIG. 6) may be mounted in a slot, on the plate 66 for adjusting tension of the drive belt 69.

Turning now to FIG. 8, there is seen a perspective view of the drive face of the driving coupler 53, which includes three wedge-shaped driving members designated 53A. The mating surface of the mating driven coupler 55 is similarly shaped to form a driving engagement with member 53. These mating, engaging surfaces are inclined relative to a plane passing through the axis of rotation.

The shape of the driving surfaces of the couplers 53, 57 creates an overrunning type clutch and a self-centering engagement between the first coupler 53 and the second coupler 57. When rotational power is applied to the drive from the tractor PTO the mating surfaces of the coupler elements, 53 and 57, are urged towards engagement. Additional load placed on the driven member, 57, increases the engagement force. Also, the shape of the engaging surfaces causes the two members to self-center and therefore become self supporting, eliminating wear between the mating surfaces.

When the planter is moved to the transport position the two coupling surfaces can slide on each other and the driven member, 57, can rotate slightly to allow disengagement without excessive force being transmitted or damage being caused to the driving surfaces of the couplers. Disengagement of the driver and driven members, while normally done with the tractor PTO not operating (rotating) can be done with the PTO under full tractor power. Likewise, if the tractor PTO is suddenly stopped and momentum causes the driven part of the coupler to continue to rotate for some period of time, the spring engagement and the shape of the coupler surfaces will allow the driven member, 57, to "overturn" and slow at its own rate without causing excessive damage or wear to be imparted to the driving coupler element 53.

Turning now to FIGS. 9-11, there is shown the manner in which adjacent segments of the segmented drive shaft 20 are joined together. The two adjacent drive shaft segments shown in FIG. 9 are designated 74, 75; and they are joined by a splined connecting shaft or pin 78. The center of the connecting shaft 78 is received in a bearing 80 (see FIG. 9). The bearing 80 is provided with first and second support similar spacers 84 which, in turn, are supported in the upper tube 27A of the moveable inner telescoping member 27.

Referring to FIG. 10, the spacers 84 include a central opening 87 for supporting the bearing 80, and include four support "corners" or points designated 89 which fit into the rounded inner corner surfaces of the moveable inner telescoping member 27 for supporting the segmented drive shaft 20 along the center of the upper tube 27A of the inner telescoping member 27, as well as housing the bearings 80. In this manner, the main drive shaft may be adjusted to whatever length is desirable or necessary to accommodate the overall length of the planter tongue.

Figure 12:
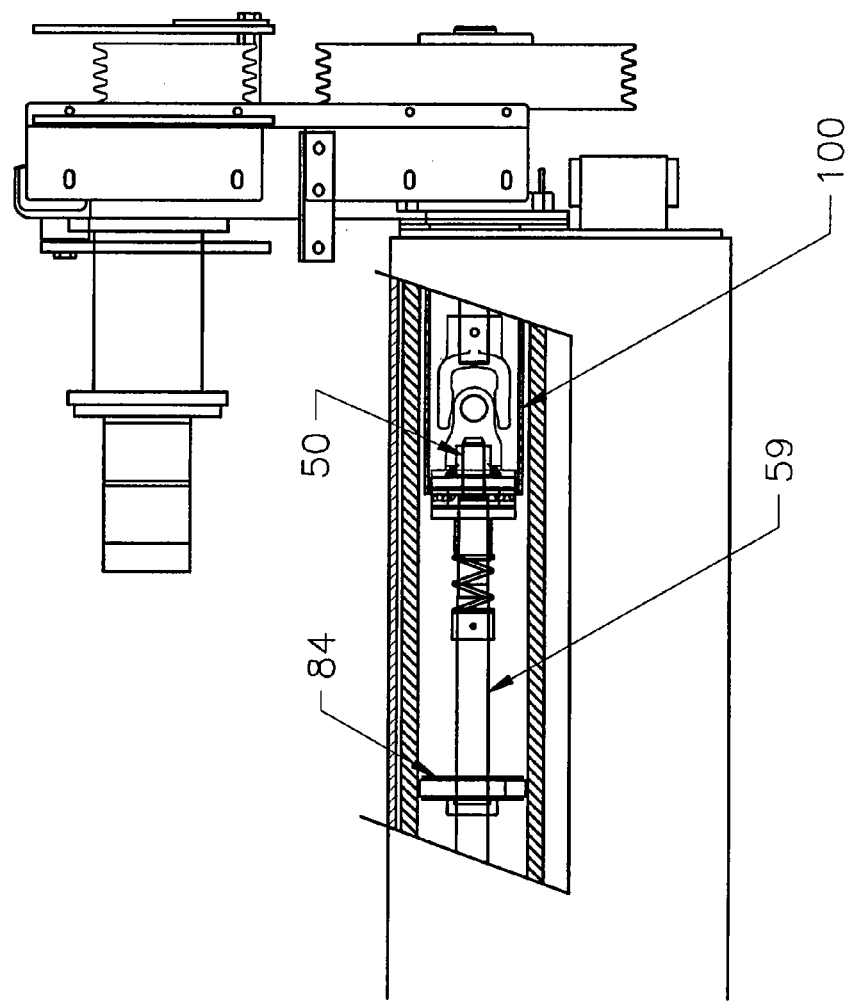
FIG. 12 is a fragmentary vertical cross-sectional view of the rear end of the telescoping tongue showing a modified structure for the disengageable drive coupler for the drive line, in the engaged position.
Figure 12A:
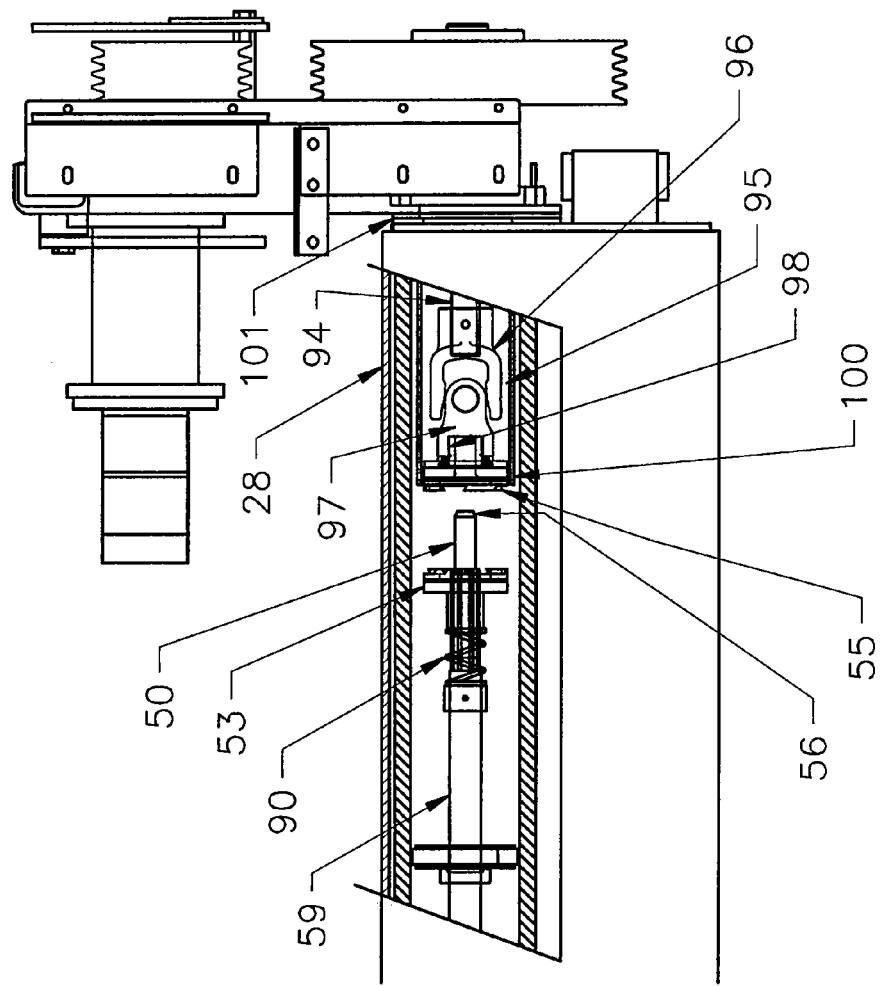
FIG. 12A is a view similar to FIG. 12 with the drive coupler disengaged.

Turning now to FIGS. 12 and 12A, there is shown a modification of the disengageable drive line between the PTO of the tractor and the planter-mounted remote hydraulic pump 29. This modification facilitates and insures the re-engagement of the drive line when the planter is set up for field use. Structure or elements which are the same as those described above for the first embodiment have the same reference number. Guide pin 50 has a chamfered guide or leading surface 56, and the output or stub shaft 94 drives the pulley 67, as described above. The shaft 59 is supported by bearing 84, as needed, and the forward coupling member 90 (FIG. 12A) is biased toward the rear by spring 91.

Mounted to the rear of moveable outer tubular member 28 is a shaft 94 which is supported by bearings and connected to drive the previously described pulley 67. At the forward end of the rear shaft 94 is a universal coupler generally designated 95 comprising a first U-shaped member 96 mounted to shaft 94, a second U-shaped member 97 pivotally mounted to the first U-shaped member 97 to permit motion in all directions relative to the axis of the shaft 59A. The second member 97 is mounted to the second or moveable drive coupling member 55, and defines the receptacle 63 for the guide pin 50.

A tube 100 is secured at its rear end to an end plate 101 of the outer telescoping member 28, and it is sized to permit the components of the universal coupler 95 to move a limited amount relative to the axis of the shaft 59, as constrained by the wall of the tubular support 100. This arrangement of limiting the radial motion of the coupling and tapered guide surface 56 facilitates and insures that the guide pin 50 will be seated properly and reliably into the receptacle 98, thereby insuring proper alignment for the two drive members when the planter is configured to the field use or planting position. The force of moving the telescoping members to the field position forces the guide pin 59 to straighten out the U-shaped member 97 of the universal coupler, while support tube 100 limits or restrains lateral movement of the receptacle 63. Other support/limit devices or structure may be used in place of tube 100.

Turning now to the embodiment illustrated in FIGS. 13-18, briefly, in this embodiment, the horizontal section of the drive line is mounted to, and supported on top of the telescoping members. This has the advantage that the hydraulic pump may also be mounted at any position along the outer, moveable telescoping member and, therefore, provide greater flexibility in positioning the pump and routing hoses to the planter superstructure, row units, seed meters, marker arms, and so on.

Figure 13:
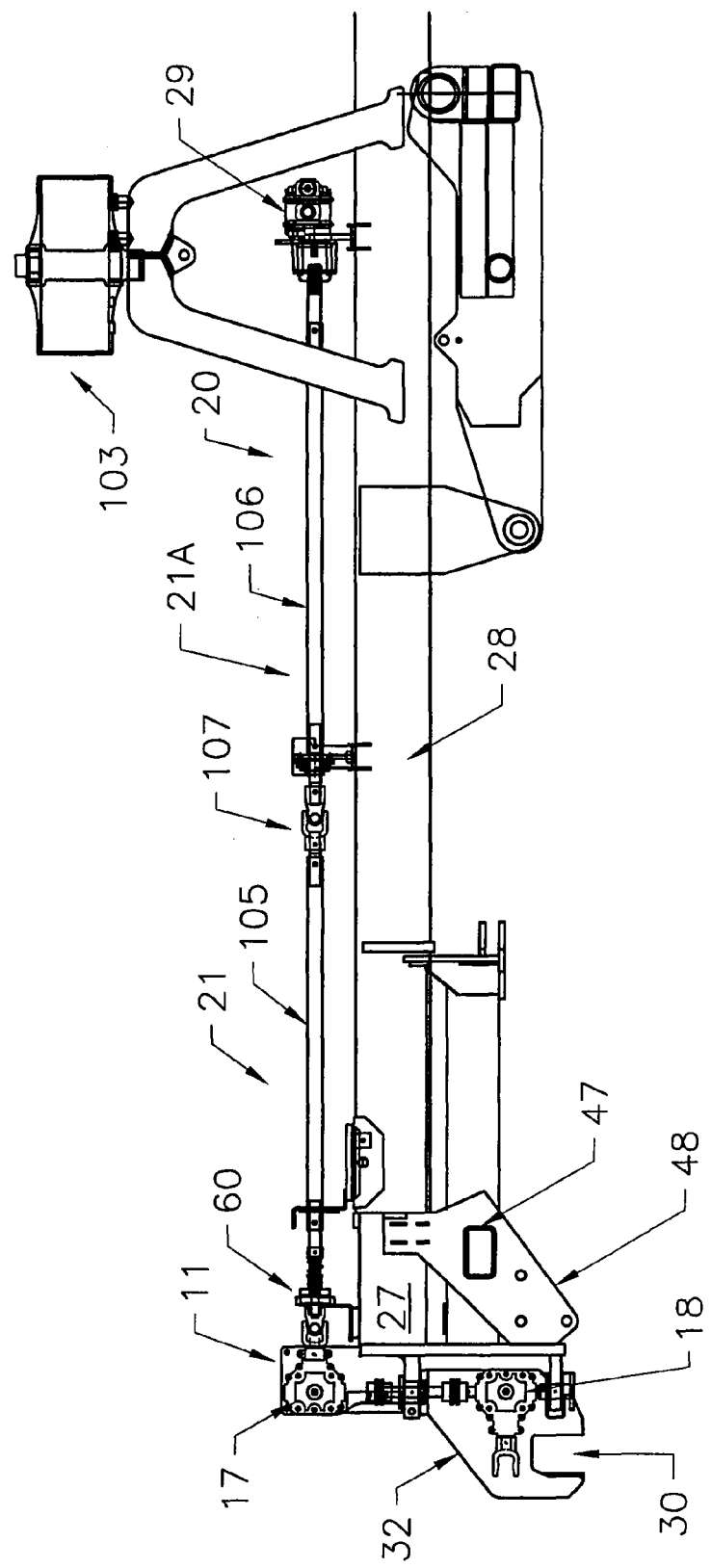
FIG. 13 is a side view of a planter showing a disengageable drive line mounted outside and carried by the telescoping tongue.

Turning then to FIG. 13, the tractor power take-off is not illustrated because it may be identical to a conventional power take-off as illustrated at 10 in FIG. 1. Further, the hitch section of the power line, generally designated 11, may be the same as that shown in FIG. 1, and described above. In the embodiment of FIG. 13, the hydraulic pump 29 is mounted to the top of telescoping tubular member 28 to facilitate the routing of hydraulic hoses and reduce the length and complexity of the hydraulic distribution system.

The drive line between the hitch section 11 and the hydraulic pump 29 includes, in the embodiment of FIG. 13, a forward shaft 105 and a rear shaft 106 connected by a universal coupler 107. The rear end of the shaft 106 is connected directly to the input drive of the hydraulic pump 29; and the forward end of the forward shaft 105 the rear of the disengageable drive coupler 60, which may be the same as previously described. It will be observed, however, that the position of the drive coupler 60 in the engaged position is at the forward end of the inner, fixed telescoping member 27—i.e. when the planter is in the field position.

Figure 14:
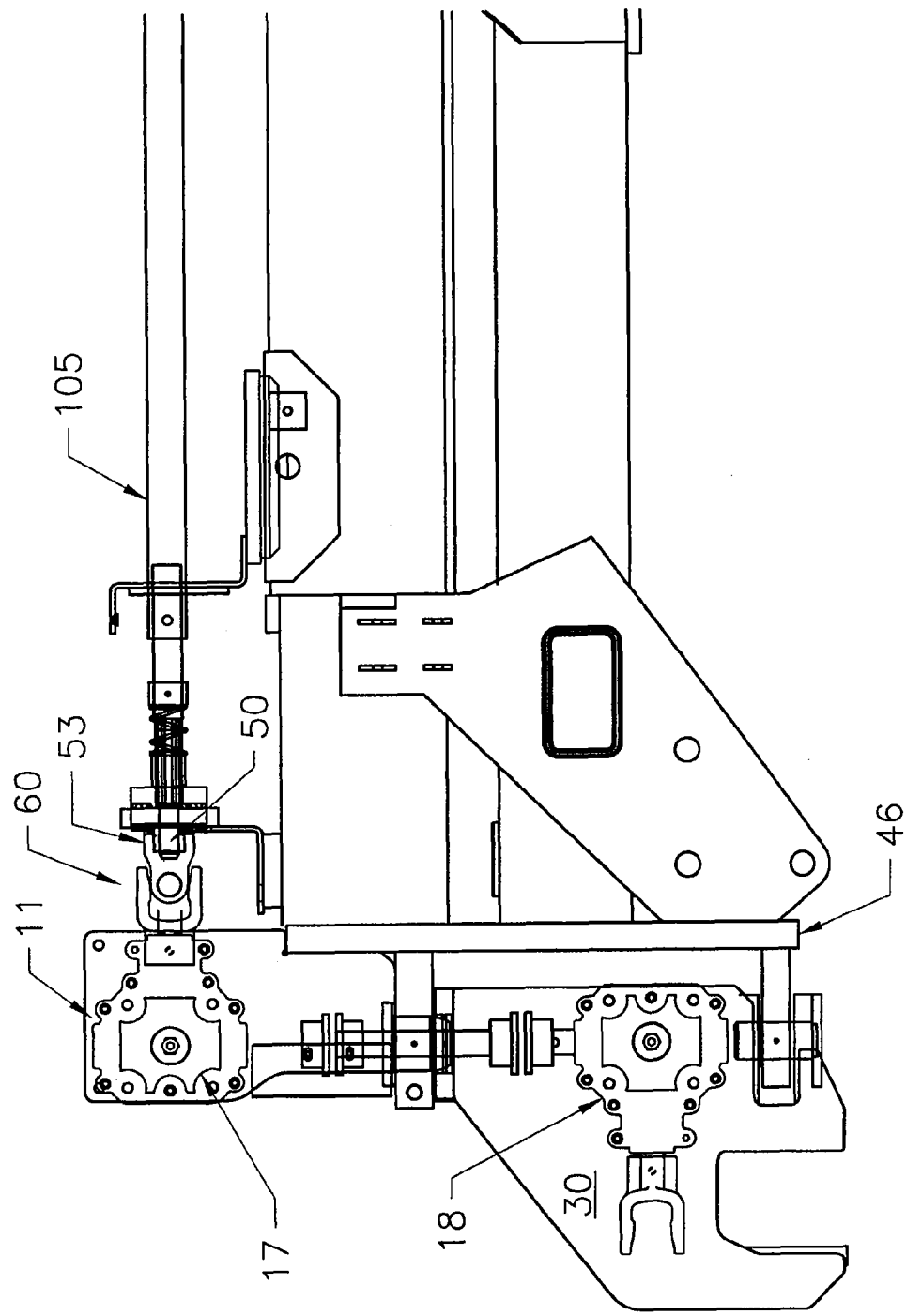
FIG. 14 is a close-up view of the front section of the apparatus shown in FIG. 13, particularly illustrating the disengaging mechanism and its location and mounting.
Figure 15:
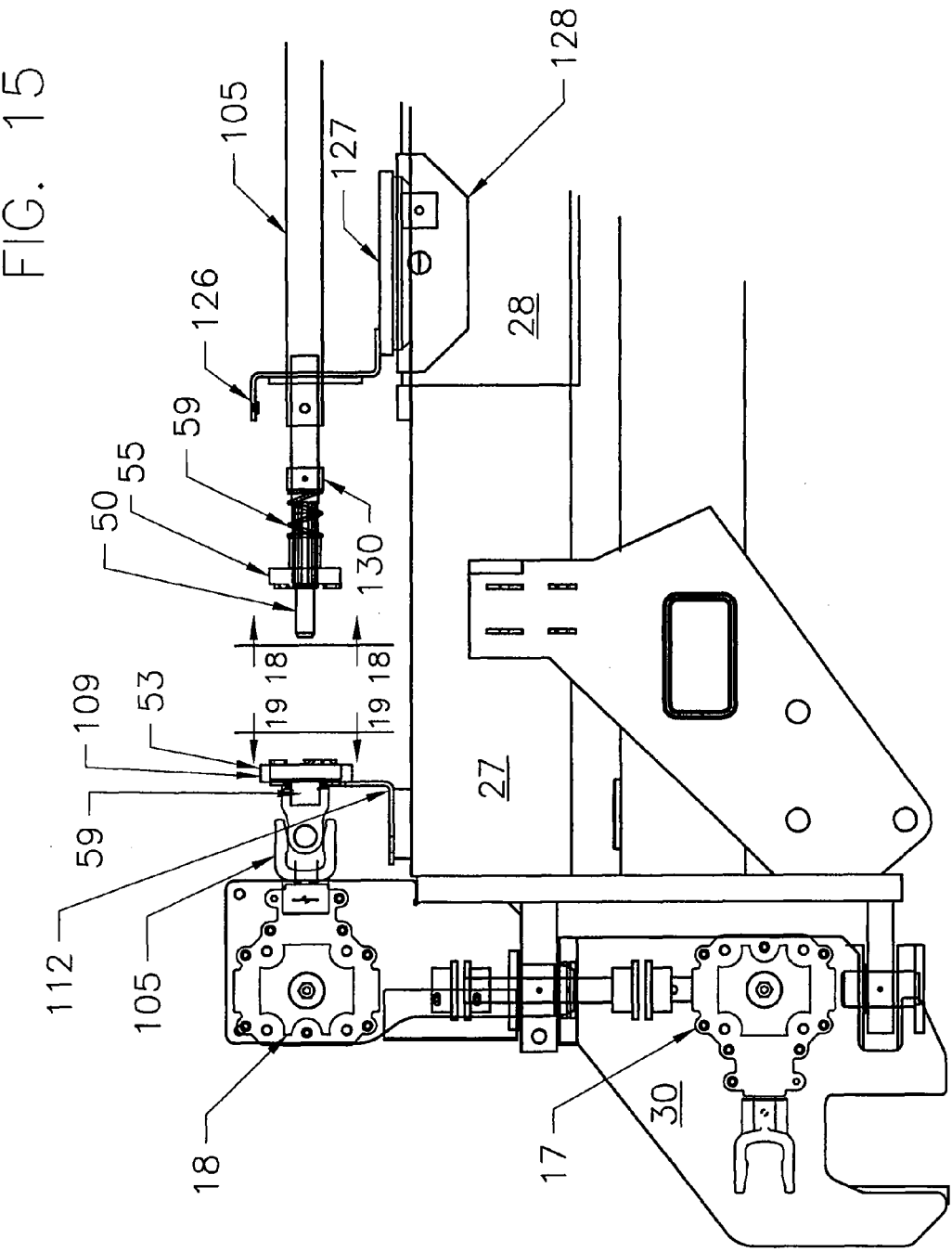
FIG. 15 is an enlarged, vertical left side view similar to FIG. 14 with the engaging mechanism in a disengaged state.
Figure 17:
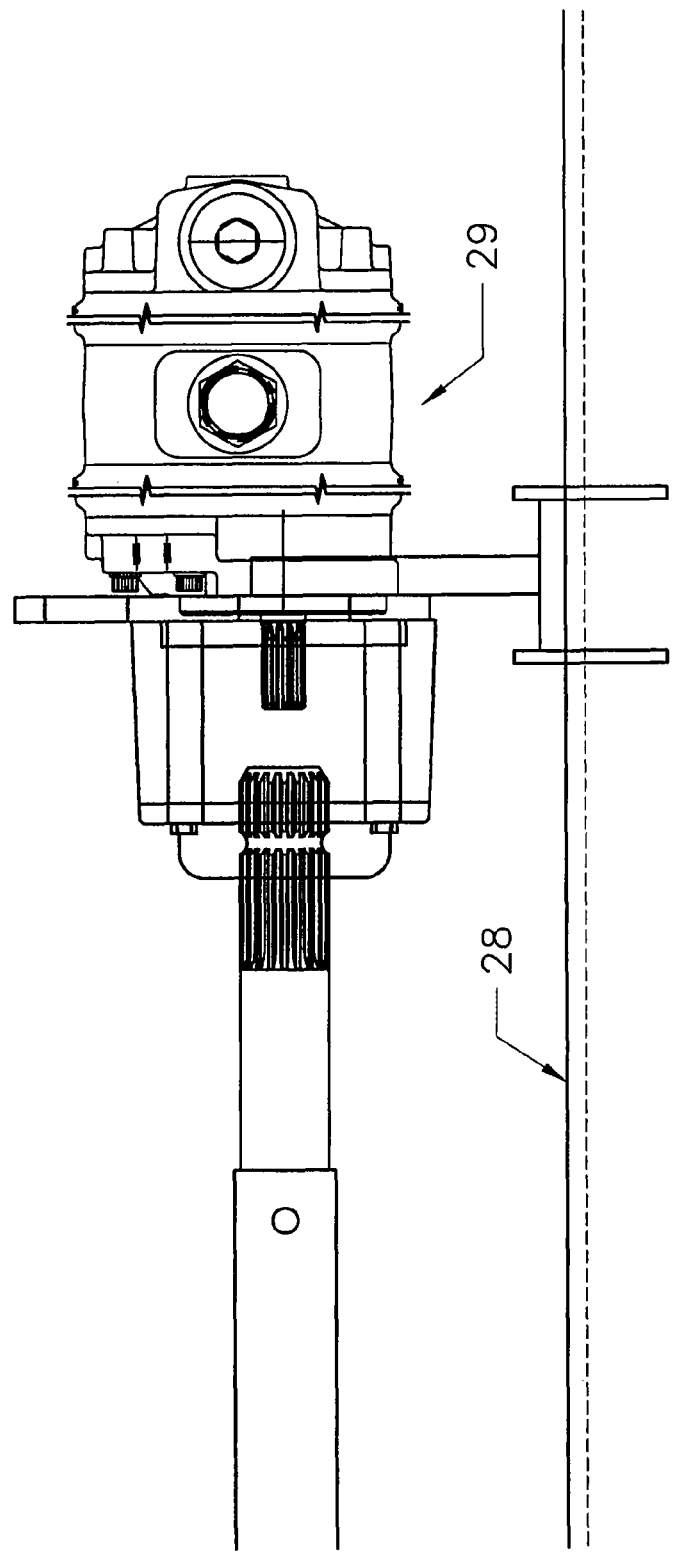
FIG. 17 is a close-up view showing the mounting of the hydraulic pump for the embodiment having the drive line outside the tubular tongue.

Turning now to FIG. 14, a universal coupler generally designated 60 is connected at its forward end to the output drive shaft of the upper right angle gear 17; and at its rear end, it carries guide pin 59 carried by a universal coupler 60, as described above. The rear drive coupling 55 is mounted to the shaft 108, which, in turn, is supported by a bracket 126 which is mounted to the upper wall of the fixed telescoping member 27, as will be described. FIG. 15 is a close-up view of the coupler and mount, and FIG. 17 shows the mounting and drive line connection to the pump 29.

Figure 19:
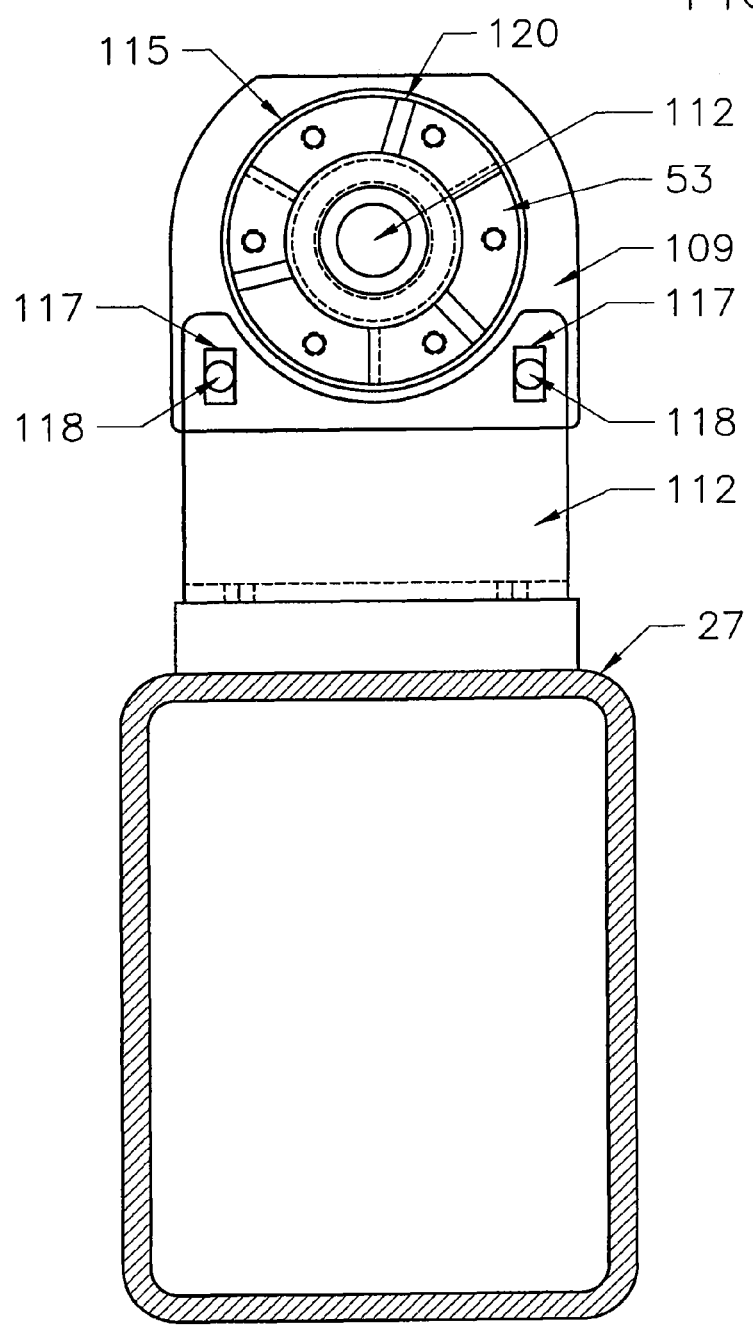
FIG. 19 is a vertical end view taken through the sight line 19-19 of FIG. 15.

Turning now to FIG. 19, it is a vertical end view looking from the right in FIG. 15 and located along section line 19-19 thereof. As can be seen, the drive coupling 53 includes a center opening 112 for receiving a guide pin, to be described. The support bracket 109 defines a central circular opening 115 for supporting the carrier member 109 which is adjustably mounted to the bracket 109 by means of slack 117 and threaded apertures 118. This adjustment locates the access of the receptacle 112, but the diameter of the opening 115 in the support 109 is slightly larger than the diameter of the perimeter 120 of the drive coupling 53, thereby enabling a certain amount of "play" in the radial location of the center of the drive coupling. However, the amount of "play" or movement of the drive coupler during periods when the two individual drive couplings are not in drive relation is limited so that when the spring-biased guide pin 50, previously described in connection with the earlier embodiment, enters the receptacle 112, there is room for the drive coupling 53 to be re-centered and accurately aligned the forward and rear drive coupling members 53, 55.

Returning now to FIG. 15, the forward drive coupling member 53 is carried by a bracket 126.

Figure 18:
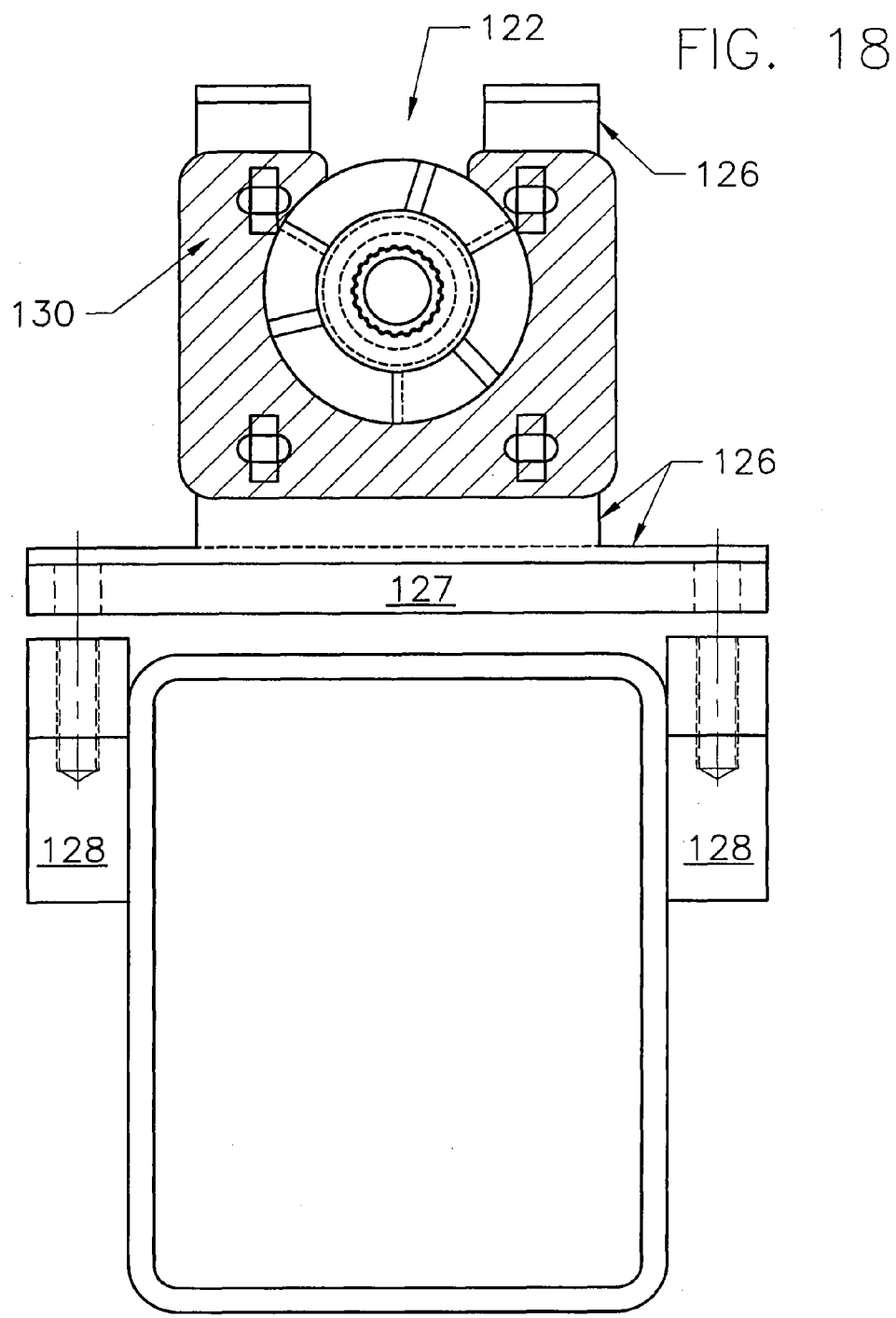
FIG. 18 is an end view of the face of the moveable drive coupler in the disengaged state taken along sight line 18-18 of FIG. 15.

Still referring to FIG. 15, the forward surface of the bracket 126 (which, it will be observed from FIG. 18 has a general capital U-shape defining an upwardly facing opening 122 which receives the shaft 105 (permitting it to be assembled to from the top), is provided with a support plate 127 which is secured to the bracket by conventional fasteners.

Figure 16:
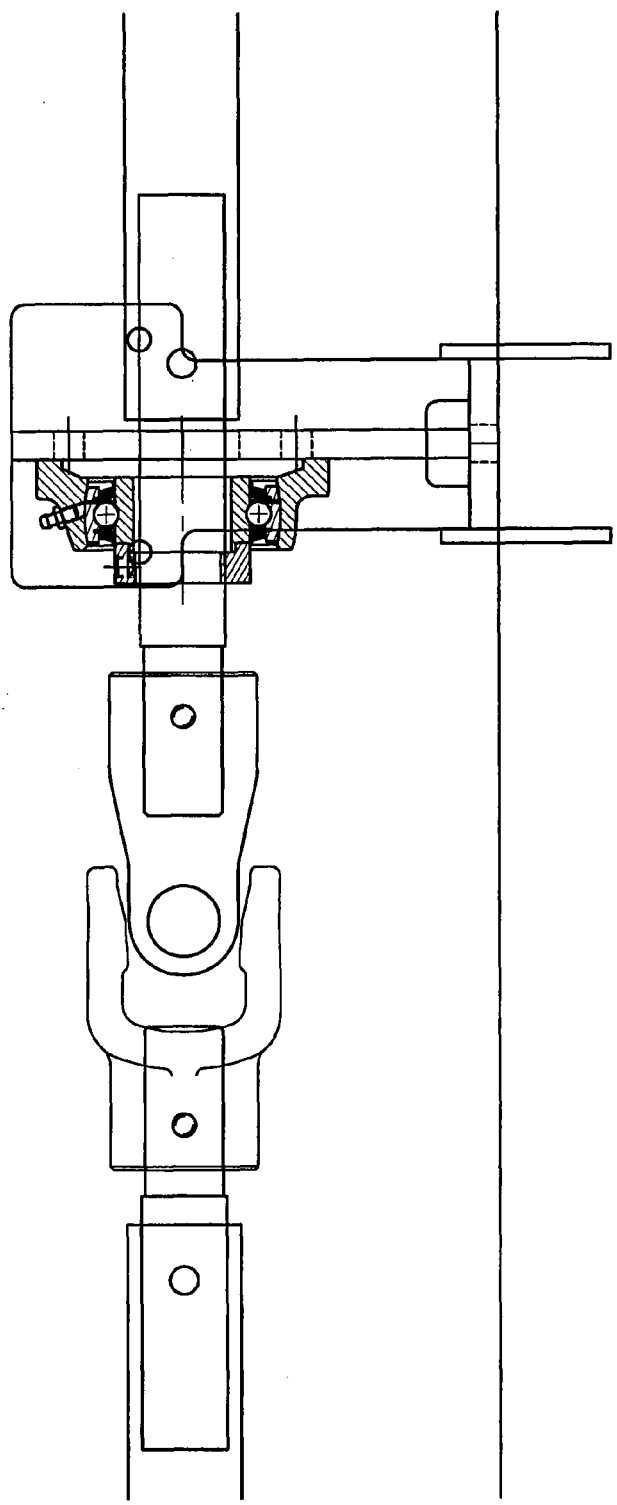
FIG. 16 is a fragmentary close-up view showing a support bearing and the drive line of FIG. 14.

Referring to FIG. 16, the forward end of the universal coupling 60 is provided with an extension 59 which is mounted to the universal coupler 60, which in turn is connected to the output drive shaft of right-angle gear 17.

Turning now to FIG. 14, drive shaft 105 is connected to a short shaft 108 which is connected to, and carries, guide pin 59 which is biased forward by spring 57 to guide the drive coupling member 55 into alignment and driving engagement with coupling member 53.

Having thus disclosed alternate embodiments of the invention, it will be appreciated that persons skilled in the art will be able to modify what has been disclosed or substitute equivalent elements for those described, and it is therefore intended that all such substitutions and modifications be covered as they are embraced in the following claims.

The invention claimed is:

1. An agricultural planter comprising:

first and second tubular members arranged in telescoping relation for being placed in a transport position or a field use position, said first tubular member having a forward end secured to a hitch and said second tubular member having a rear end;

an hydraulic pump carried by said second tubular;

a drive line extending from a power take off to said hydraulic pump, and including a disengageable drive shaft line having at least a first segment connected at a forward end to said power take off of a tractor, and a second segment connected at a rear end to drive said hydraulic pump;

a first drive coupling member mounted to said first segment of said drive train;

a second drive coupling member mounted to said second segment of said drive shaft, and wherein said first and second drive coupling members are in driving relation when said first and second telescoping members are in said field use position, and said first and second drive coupling members are uncoupled when said first and second telescoping members are in said transport position.

2. The planter of claim 1 further including a first right angle gear having an input shaft adapted to be coupled to a tractor power take-off and having an output shaft extending generally vertically; and a second right angle gear having an input shaft connected in line with said output shaft of said first right angle gear and an output shaft connected to drive said first segment of said segmented drive shaft.

3. The planter of claim 2 wherein said drive line includes a drive shaft extending along the interior of said first and second telescoping tubular members.

4. The planter of claim 2 wherein said drive shaft first and second sections mounted to the exterior of said first and second tubular members respectively.

5. The planter of claim 2 wherein said output shaft of said first right angle gear and said input shaft of said second right angle gear are aligned in a vertical line extending along the turn axis of said hitch.

6. The planter of claim 1 wherein said planter includes a hitch having a vertical hitch axis about which said planter turns relative to a draft vehicle, and characterized in that the output shaft of said first right angle gear and the input shaft of said second right angle gear have their respective axes aligned along said hitch axis.

7. The planter of claim 3 wherein said drive shaft is mounted on the exterior of said first and second tubular members.

8. The planter of claim 1 wherein one of said drive couplers includes a central receptacle and the other of said drive couplers includes a guide pin extending along an axis of the associated drive shaft and in alignment with said guide pin to facilitate engagement of said first and second segments of said drive shaft.

9. The planter of claim 8 wherein said hydraulic pump is mounted to the top of the moveable telescoping member.

10. The planter of claim 1 further comprising:
a support member for one of said drive couplers defining a receptacle for an axially extending guide pin, said support member limiting the radial displacement of said one drive member to facilitate re-engagement of said drive couplers.

11. The planter of claim 10 wherein said support member is a tube secured to said moveable telescoping member.

12. The planter of claim 11 wherein said support member is a generally U-shaped member having a slot with an open top to support an associated drive coupler having a guide pin.

* * * * *